(12) United States Patent
Tong

(10) Patent No.: US 11,339,091 B2
(45) Date of Patent: May 24, 2022

(54) CEMENTITIOUS MATERIAL AND PRODUCTION METHOD THEREOF

(71) Applicant: Environment Sustainable System Engineering Technology Co., Ltd., Beijing (CN)

(72) Inventor: Shanghui Tong, Beijing (CN)

(73) Assignee: Environment Sustainable System Engineering Technology Co., Ltd., Beijing (CN)

( * ) Notice: Subject to any disclaimer, the term of this patent is extended or adjusted under 35 U.S.C. 154(b) by 107 days.

(21) Appl. No.: 16/650,725

(22) PCT Filed: Aug. 29, 2018

(86) PCT No.: PCT/CN2018/103036
§ 371 (c)(1),
(2) Date: Mar. 25, 2020

(87) PCT Pub. No.: WO2019/062454
PCT Pub. Date: Apr. 4, 2019

(65) Prior Publication Data
US 2020/0308049 A1    Oct. 1, 2020

(30) Foreign Application Priority Data
Sep. 30, 2017    (CN) .......................... 201710918987.9

(51) Int. Cl.
| C04B 18/06 | (2006.01) |
| C04B 18/08 | (2006.01) |
| C04B 9/04 | (2006.01) |
| B01D 53/60 | (2006.01) |
| C04B 28/34 | (2006.01) |
| C04B 28/10 | (2006.01) |

(52) U.S. Cl.
CPC ............. *C04B 9/04* (2013.01); *B01D 53/60* (2013.01); *C04B 18/067* (2013.01); *C04B 18/08* (2013.01); *C04B 28/105* (2013.01); *C04B 28/348* (2013.01); *B01D 2251/402* (2013.01); *B01D 2251/404* (2013.01); *B01D 2251/602* (2013.01); *B01D 2253/1124* (2013.01); *B01D 2255/2073* (2013.01); *B01D 2255/20723* (2013.01); *B01D 2255/20738* (2013.01); *B01D 2258/0283* (2013.01)

(58) Field of Classification Search
CPC ......... C04B 9/04; C04B 18/067; C04B 18/08; C04B 28/348; C04B 18/02; C04B 2111/00008; C04B 28/105; C04B 28/021; C04B 28/08; C04B 28/34; B01D 2253/1124; B01D 2253/25; B01D 2253/304; B01D 2251/404; B01D 2251/402; B01D 2251/602; B01D 53/60; B01D 53/83; B01D 2258/0283; B01D 2255/2073; B01D 2255/20738; B01D 2255/20723; B01D 50/00; B01D 53/96; B01D 53/80; B01D 53/86; B01D 53/02; B01D 53/90; B01D 53/04; B01D 53/025; B01D 53/81; B01D 53/46; B01D 53/48; B01D 53/54; B01D 53/56; B01D 53/565; B01J 20/10; B01J 20/30; B01J 23/00; B01J 23/889; B01J 21/00; F23J 15/02

See application file for complete search history.

(56) References Cited

U.S. PATENT DOCUMENTS

2017/0088467 A1 *  3/2017 Tong ...................... C04B 28/32

FOREIGN PATENT DOCUMENTS

| CN | 102824844 A | * | 12/2012 | |
| CN | 102824844 A | | 12/2012 | |
| CN | 102836636 A | * | 12/2012 | |
| CN | 104446063 A | | 3/2015 | |
| CN | 104446064 A | * | 3/2015 | ............... C04B 9/04 |
| CN | 104496235 A | * | 4/2015 | |
| CN | 104857835 A | | 8/2015 | |
| CN | 104998539 A | | 10/2015 | |
| CN | 106731783 A | * | 5/2017 | |

(Continued)

OTHER PUBLICATIONS

Concrete @ Your Fingertips [Retrieved from the internet <URL:http://www.concrete.org.uk/fingertips-nuggets.asp?cmd=display&id=136>, on Aug. 25, 2021] (Year: 2021).*
CN-102836636-A, machine translation (Year: 2012).*
Filter, Mesh to Micron Conversion chart [Retrieved from the internet <URL: http://www.filtersolutions.com/pdf/mesh%20to%20micron%20conversion%20chart.pdf>, on Aug. 26, 2021 (Year: 2021).*
CN-102824844-A, machine translation (Year: 2021).*
CN-106881060-A, machine translation (Year: 2017).*
CN-106731783-A, machine translation (Year: 2017).*
CN-104496235-A, machine translation (Year: 2015).*

(Continued)

*Primary Examiner* — Kevin E Yoon
*Assistant Examiner* — Marites A Guino-O Uzzle
(74) *Attorney, Agent, or Firm* — Osha Bergman Watanabe & Burton LLP

(57) ABSTRACT

The present disclosure provides a cementitious material and production method thereof. The method comprises steps of: (1) dry desulfurization and denitrification of a flue gas with a flue gas absorbent to give a by-product, wherein the flue gas absorbent comprises 10-23 parts by weight of a nano-sized metal oxide, 10-23 parts by weight of a micro-sized metal oxide, and 40-60 parts by weight of magnesium oxide, the nano-sized metal oxide being selected from one or more of the group consisting of $SiO_2$, $CaO$, $Fe_2O_3$, $Al_2O_3$, $CuO$, $V_2O_5$ and $MnO_2$, and the micro-sized metal oxide being selected from one or more of the group consisting of $SiO_2$, $CaO$, $Fe_2O_3$, $Al_2O_3$, $CuO$, $V_2O_5$ and $MnO_2$; and (2) uniformly mixing the by-product with magnesium oxide, an industrial solid waste and an additive to give the cementitious material.

5 Claims, No Drawings

(56) References Cited

FOREIGN PATENT DOCUMENTS

CN    106881060 A  *  6/2017
CN    107500581 A     12/2017

OTHER PUBLICATIONS

M. Shimokawabe, A. Ohi and N. Takezawa. Catalytic decomposition of nitrogen dioxide over various metal oxides, Applied Catalysis A: General, 85 (1992) 129-133 <URL:https://www.sciencedirect.com/science/article/abs/pii/0926860X92801464> (Year: 1992).*
International Search Report issued in International Application No. PCT/CN2018/103036 dated Nov. 21, 2018 (8 pages).
Written Opinion issued in International Application No. PCT/CN2018/103036 dated Nov. 21, 2018 (4 pages).
Office Action issued in corresponding CN Application No. 201710918987.9 dated Apr. 3, 2019 (4 pages).

* cited by examiner

CEMENTITIOUS MATERIAL AND PRODUCTION METHOD THEREOF

TECHNICAL FIELD OF THE DISCLOSURE

The present disclosure relates to a cementitious material and a method for producing the same, in particular to a cementitious material produced by dry desulfurization and denitrification of a flue gas, and a method for producing the same.

BACKGROUND OF THE DISCLOSURE

As fundamental materials for the modernization of China, cementitious materials are extremely important in building of infrastructure construction. The cement industry consumes an enormous amount of energy and brings about many by-products that contaminate the environment, such as dust, $CO_2$, $SO_2$, NOx, and waste water. These pollutants have been found to have a close link with haze, photochemical smog, and acid rain. For example, such processes as the storage and transportation of raw materials, flues and finished cement products, as well as pulverizing, drying, grinding and calcining of materials, produce a large amount of dust. As another example, the calcination of cement generates a large amount of carbon disulfide and carbon dioxide, which seriously contaminates the environment.

In China, by-products from the magnesium-based desulfurization and denitrification and dust removal of a flue gas have not been efficiently utilized, so the reuse of the by-products has become a hot issue in the environmental protection industry. Solving this problem will make a huge contribution to environmental protection. Besides, costs incurred by the desulfurization and denitrification of a flue gas can be offset by the reuse of the by-products. The China patent application with application number 201510485072.4 discloses an integrated purification process for dry desulfurization and denitrification and dust removal of a flue gas. The process comprises: preliminarily denitrifying a flue gas from a coal-fired boiler by a SNCR denitrification system; introducing the flue gas to a flue, where the dust is removed from the flue gas by a dust removal system; purifying the flue gas once again by spraying a dry absorbent powder into the flue; subjecting the purified flue gas to filtration by a filtering system; and discharging the flue gas via the chimney. This purification process is an integrated purification process for fully dry desulfurization and denitrification and dust removal of a flue gas. It achieves a desulfurization rate of 95% but a denitrification rate of about 75%. In addition, it does not make full use of the by-products. The China patent application with application number 201510304904.8 discloses an integrated method for processing a flue gas. The method fulfills the purpose of simultaneous desulfurization, denitrification, mercury removal, dust removal and mist removal of a flue gas by using a wet absorption desulfurization device in combination with the coordinated oxidation by ozone and hydrogen peroxide. However, the method has to consume a large amount of water in addition to generating a large amount of waste water. So, the method will find limited application in arid areas.

SUMMARY OF THE DISCLOSURE

One objective of the present disclosure is to provide a method for producing a cementitious material which can avoid generating excessive industrial waste water, integratedly desulfurize and denitrify a flue gas and process solid wastes, and obtain a qualified cementitious material.

Another objective of the present disclosure is to provide a cementitious material which has satisfactory performance and makes full use of industrial solid wastes.

The present disclosure provides a method for producing a cementitious material, which comprises steps of:

(1) dry desulfurization and denitrification of a flue gas with a flue gas absorbent to give a by-product, wherein the flue gas absorbent comprises 10-23 parts by weight of a nano-sized metal oxide, 10-23 parts by weight of a micro-sized metal oxide, and 40-60 parts by weight of magnesium oxide, the nano-sized metal oxide being selected from one or more of the group consisting of $SiO_2$, CaO, $Fe_2O_3$, $Al_2O_3$, CuO, $V_2O_5$ and $MnO_2$, and the micro-sized metal oxide being selected from one or more of the group consisting of $SiO_2$, CaO, $Fe_2O_3$, $Al_2O_3$, CuO, $V_2O_5$ and $MnO_2$; and (2) uniformly mixing the by-product with magnesium oxide, an industrial solid waste and an additive to give a cementitious material, wherein the industrial solid waste is selected from one or more of the group consisting of fly ash, a slag powder, and a construction waste powder, and the additive is selected from one or more of the group consisting of dihydrogen phosphate, monohydrogen phosphate, tartaric acid, tartrate and amino trimethylene phosphonic acid.

In the method of the present disclosure, it is preferable that in step (1), the flue gas absorbent is in a dry powder form.

In the method of the present disclosure, it is preferable that during the dry desulfurization and denitrification of step (1), the flue gas has a sulfur dioxide content of 300-40,000 $mg/Nm^3$, a nitrogen oxide content of 50-600 $mg/Nm^3$, an oxygen content of 10-18 vol %, a flow velocity of 2-5 m/s, and a temperature of 110-200° C.

In the method of the present disclosure, it is preferable that in step (1), the flue gas absorbent comprises 12-22 parts by weight of the nano-sized metal oxide, 12-20 parts by weight of the micro-sized metal oxide, and 42-60 parts by weight of magnesium oxide.

In the method of the present disclosure, it is preferable that in step (1), the nano-sized metal oxide comprises $Fe_2O_3$, $V_2O_5$ and $MnO_2$, and the micro-sized metal oxide comprises $Fe_2O_3$, $V_2O_5$ and $MnO_2$.

In the method of the present disclosure, it is preferable that $Fe_2O_3$, $V_2O_5$ and $MnO_2$ in the nano-sized metal oxide are at a weight ratio of 3-5:3-8:5-10, and $Fe_2O_3$, $V_2O_5$ and $MnO_2$ in the micro-sized metal oxide are at a weight ratio of 3-5:3-8:5-10.

In the method of the present disclosure, it is preferable that $Fe_2O_3$, $V_2O_5$, and $MnO_2$ in the nano-sized metal oxide are at a weight ratio of 4-5:5-6:6-7, and $Fe_2O_3$, $V_2O_5$, and $MnO_2$ in the micro-sized metal oxide are at a weight ratio of 4-5:5-6:6-7.

In the method of the present disclosure, it is preferable that in step (2), the by-product, magnesium oxide, the industrial solid waste and the additive are at a weight ratio of 100:50-200:50-150:3-15.

In the method of the present disclosure, it is preferable that in step (2), the industrial solid waste is selected from a composition consisting of a slag powder and fly ash at a weight ratio of 30-80:30-100.

The present disclosure further provides a cementitious material which is produced by any one of the methods described above.

The method of the disclosure is capable of desulfurizing and denitrifying a flue gas from an enterprise while utilizing the industrial solid waste generated inside the enterprise, thereby reducing the costs of material transportation and turning the useless into the useful. The dry desulfurization and denitrification of a flue gas not only may avoid generating a large amount of industrial waste liquid but also generate a by-product which has sulfates and nitrates as its main components. The by-product is fully utilized, which significantly reduces the cost of a resultant cementitious material. The resultant cementitious material is manufactured at a low cost and can directly replace those traditional cements 325 #, 425 #, 525 #. An optimized technical solution of the present disclosure solves problems that have long plagued iron- and steel-making enterprises and coal-fired power plants in using traditional desulfurization and denitrification technologies, including a low removal rate, and low reutilization and even costly disposal of the by-product.

DETAILED DESCRIPTION OF EMBODIMENTS

The following is a further description of the present disclosure by way of embodiments, but the scope of protection of the present disclosure is not limited to them.

The method for producing a cementitious material according to the present disclosure comprises steps of (1) desulfurization and denitrification; and (2) mixing. See below for the detailed description of the method.

<Desulfurization and Denitrification>

Dry desulfurization and denitrification of a flue gas is performed with a flue gas absorbent to give a by-product. The desulfurization and denitrification may be performed in a device common in the art, so no more details are given here. In the present disclosure, the flue gas absorbent may comprise 10-23 parts by weight of a nano-sized metal oxide, 10-23 parts by weight of a micro-sized metal oxide, and 40-60 parts by weight of magnesium oxide. The nano-sized metal oxide may be selected from one or more of the group consisting of $SiO_2$, $CaO$, $Fe_2O_3$, $Al_2O_3$, $CuO$, $V_2O_5$ and $MnO_2$. The micro-sized metal oxide may be selected from one or more of the group consisting of $SiO_2$, $CaO$, $Fe_2O_3$, $Al_2O_3$, $CuO$, $V_2O_5$ and $MnO_2$. Preferably, the flue gas absorbent may comprise 12-22 parts by weight of the nano-sized metal oxide, 12-20 parts by weight of the micro-sized metal oxide, and 42-60 parts by weight of magnesium oxide. More preferably, the flue gas absorbent may comprise 15-22 parts by weight of the nano-sized metal oxide, 15-20 parts by weight of the micro-sized metal oxide, and 45-60 parts by weight of magnesium oxide. Controlling the ingredients of the flue gas absorbent to fall within the ranges described above makes denitrification much more effective, thereby ensuring the stability of the by-product and the cementitious material.

For the flue gas absorbent in the present disclosure, the nano-sized metal oxide may have a particle diameter of 10-100 nm, preferably 20-90 nm. The micro-sized metal oxide may have a particle diameter of 1-500 μm, preferably 10-100 μm. A combination of the metal oxides of different particle sizes and magnesium oxide makes the removal of sulfur dioxide and nitrogen oxides in the flue gas more effective, thereby making it possible to stably generate the by-product and thus stably produce a cementitious material.

For the flue gas absorbent in the present disclosure, the nano-sized metal oxide may be selected from one or more of the group consisting of $CaO$, $Fe_2O_3$, $CuO$, $V_2O_5$ and $MnO_2$. The micro-sized metal oxide may be selected from one or more of the group consisting of $CaO$, $Fe_2O_3$, $CuO$, $V_2O_5$ and $MnO_2$. For example, the nano-sized metal oxide preferably comprises $Fe_2O_3$, $V_2O_5$ and $MnO_2$. The micro-sized metal oxide preferably comprises $Fe_2O_3$, $V_2O_5$ and $MnO_2$. In one embodiment of the present disclosure, $Fe_2O_3$, $V_2O_5$ and $MnO_2$ in the nano-sized metal oxide are at a weight ratio of 3-5:3-8:5-10. $Fe_2O_3$, $V_2O_5$, and $MnO_2$ in the micro-sized metal oxide are at a weight ratio of 3-5:3-8:5-10.

Along with the flue gas, $SO_2$ and NO in the flue gas reach a surface of the flue gas absorbent and are adsorbed on the surface. The nano-sized $V_2O_5$ particles and the micro-sized $V_2O_5$ particles catalyze the conversion of $SO_2$ and $O_2$ in the flue gas into $SO_3$. The nano-sized $Fe_2O_3$ and $MnO_2$ particles and the micro-sized $Fe_2O_3$ and $MnO_2$ particles catalyze the conversion of NO and $O_2$ in the flue gas into $NO_2$. Then, $SO_3$ and $NO_2$ obtained by catalytic oxidation react with the absorbent including magnesium oxide and the like to generate sulfate and nitrate, while a small amount of $SO_2$ and NO in the flue gas that are left over without being oxidized react with magnesium oxide and generates sulfite and nitrite.

In one embodiment of the present disclosure, $Fe_2O_3$, $V_2O_5$ and $MnO_2$ in the nano-sized oxide are at a weight ratio of 4-5:5-6:6-7, and $Fe_2O_3$, $V_2O_5$ and $MnO_2$ in the micro-sized oxide are at a weight ratio of 4-5:5-6:6-7.

In one embodiment of the present disclosure, the flue gas absorbent comprises 60 parts by weight of magnesium oxide, 20.5 parts by weight of the nano-sized metal oxide, and 18.5 parts by weight of the micro-sized metal oxide. $Fe_2O_3$, $V_2O_5$, $MnO_2$ and CaO in the nano-sized metal oxide are at a weight ratio of 4:5:6:190. $Fe_2O_3$, $V_2O_5$, $MnO_2$ and CaO in the micro-sized metal oxide are at a weight ratio of 4:5:6:170.

In the present disclosure, the flue gas absorbent may be in a dry powder form. This makes it possible for the flue gas absorbent to be directly mixed with the flue gas and then remove $SO_2$ and NOx from the flue gas. As a result, the desulfurization and denitrification of the flue gas is performed but does not require a large amount of water and does not bring about a large amount of industrial waste liquid. For example, in the flue gas pipe the dry powder of the flue gas absorbent is mixed thoroughly with a flue gas that has been subjected to preliminary dust removal; then the resultant mixture enters an absorption tower for desulfurization and denitrification; and finally the desulfurized and denitrified flue gas is discharged via the chimney.

The dry desulfurization and denitrification of a flue gas is performed using the flue gas absorbent described above. During the dry desulfurization and denitrification, the flue gas may have a sulfur dioxide content of 300-40,000 mg/Nm$^3$, preferably 500-30,000 mg/Nm$^3$, and more preferably 600-5,000 mg/Nm$^3$. The flue gas may have a nitrogen oxide content of 50-600 mg/Nm$^3$, preferably 100-500 mg/Nm$^3$, and more preferably 450-500 mg/Nm$^3$. The flue gas may have an oxygen content of 10-18 vol %, preferably 15-18 vol %. The flue gas may have a flow velocity of 2-5 m/s and a temperature of 110-200° C. Preferably, the flue gas may have a flow velocity of 2.5-3.5 m/s and a temperature of 135-140° C. All of the above parameters of the flue gas are those of the flue gas at the inlet. The parameters of the flue gas at the outlet depend on the actual desulfurization and denitrification state. Using the parameters mentioned above helps to obtain a by-product in stable quality and thus helps to stably produce a cementitious material.

<Mixing>

The by-product is mixed with magnesium oxide, an industrial solid waste and an additive to give the cementitious material. In the present disclosure, the cementitious material may be obtained by respectively grinding the by-product, magnesium oxide, the industrial solid waste and the additive to 200 mesh or more, preferably 250 mesh or more, and then uniformly mixing them. The cementitious material may be obtained by uniformly mixing the by-product, magnesium oxide, the industrial solid waste and the additive to obtain a mixture, and then grinding the mixture to 200 mesh or more, preferably 250 mesh or more. Alternatively, the cementitious material may be obtained by mixing the by-product, magnesium oxide, the industrial solid waste and the additive that have been subjected to grinding, and further grinding the resultant mixture.

In the present disclosure, the by-product, magnesium oxide, the industrial solid waste and the additive are at a weight ratio of 100:50-200:50-50:3-15. Preferably, they are at a weight ratio of 100:100-150:100-130:5-8. Such ratios are a sufficient guarantee of the comprehensive performance of the cementitious material.

In the present disclosure, the industrial solid waste may be selected from one or more of the group consisting of fly ash, a slag powder and a construction waste powder, and it is preferably fly ash and/or a slag powder. Examples of the slag powder include but are not limited to boiler slag, mine slag, steel slag and iron slag that have been subjected to ball milling. Fly ash is fine ash collected from the flue gas of coal combustion and it is the primary solid waste discharged from coal-fired power plants. The mine slag is the slag discharged from iron-making and steel-making processes. The construction waste powder is the industrial solid waste from pulverizing a construction waste. Using the industrial solid wastes mentioned above helps to obtain a cementitious material in stable quality. The industrial solid waste preferably has a particle size of 200 mesh or more, more preferably 250 mesh or more. In one embodiment of the present disclosure, the industrial solid waste is selected from fly ash and a mine slag powder having a particle size of 200 mesh or more.

In the present disclosure, the additive is selected from one or more of the group consisting of dihydrogen phosphate, monohydrogen phosphate, tartaric acid, tartrate and amino trimethylene phosphonic acid, and it is preferably dihydrogen phosphate or monohydrogen phosphate. Examples of the additive include but are not limited to sodium dihydrogen phosphate and sodium monohydrogen phosphate. Using the additives mentioned above is a sufficient guarantee of the comprehensive performance of the cementitious material.

In one embodiment of the present disclosure, the industrial solid waste is selected from a composition consisting of a slag powder and fly ash that are at a weight ratio of 30-80:30-100, preferably a weight ratio of 40-70:40-90.
<Cementitious Material>

The method described above can stably produce a cementitious material. A cementitious material is also known as "cement," which refers to a material which changes from slurry to a stone-like solid due to physical or chemical action. The cementitious material can cement another granular or bulk-like material and thereby become an integral material with a certain mechanical strength. The respective raw materials and the ratios between them have been described above which will not be repeated here. Of the raw materials, the by-product is obtained by dry desulfurization and denitrification of a flue gas with a flue gas absorbent. The flue gas absorbent and the dry desulfurization and denitrification process have been described above.

To improve the overall performance of the product, the product of the present disclosure is preferably made of the by-product, magnesium oxide, an industrial solid waste and an additive at a weight ratio of 100:50-200:50-150:3-15, preferably 100:100-150:100-130:5-8. The industrial solid waste is selected from a composition consisting of a slag powder and fly ash at a weight ratio of 30-80:30-100, preferably 40-70:40-90.

After being cured for 28 days, the cementitious material of the present disclosure may have a compressive strength of 60-100 MPa, a bending strength of 10-20 MPa, and a water absorption of 3-10%, and may preferably have a compressive strength of 66-80 MPa, a bending strength of 15-18 MPa, and a water absorption of 5-8%.

In the following preparatory example and examples, the term "part" means a part by weight unless otherwise specified.

The properties of the cementitious materials from the following examples were measured by following GB/T50448-2008, and the samples were prepared according to a water-to-cement ratio of 0.35. Of the properties, density and water absorption were results of testing the cementitious materials after they had been cured for 28 days.

Preparatory Example 1

The raw materials listed in Table 1 were mixed uniformly to given a flue gas absorbent. The nano-sized particles have a diameter of 20 nm, and the micro-sized particles have a diameter of 10 μm.

TABLE 1

| | Formulation of Flue Gas Absorbent | | | | | | | | |
|---|---|---|---|---|---|---|---|---|---|
| | Nano-sized | | | | Micro-sized | | | | |
| Material | $Fe_2O_3$ | $MnO_2$ | $V_2O_5$ | CaO | $Fe_2O_3$ | $MnO_2$ | $V_2O_5$ | CaO | MgO |
| Parts by weight | 0.4 | 0.6 | 0.5 | 19 | 0.4 | 0.6 | 0.5 | 17 | 60 |

Examples 1-3

(1) Dry desulfurization and denitrification of a flue gas was performed using the flue gas absorbent from Preparatory example 1. The flow velocity was 2.5 m/s, and the oxygen content was 15 vol %. The other parameters of the flue gas at the inlet and the parameters of the flue gas at the outlet are shown in Tables 2 and 3.

(2) The cementitious materials were obtained by uniformly mixing the by-product having a particle size of 200 mesh or more, magnesium oxide, an industrial solid waste (fly ash plus a slag powder) having a particle size of 200 mesh or more, and an additive (sodium dihydrogen phosphate).

TABLE 2

| Parameters of Flue Gas Desulfurization and Denitrification | | | |
|---|---|---|---|
| No. | Item | Value | Unit |
| 1 | Flow velocity of flue gas at inlet (in working condition) | 1165000 | m³/h |
| 2 | Flow velocity of flue gas in standard condition | 779522 | Nm³/h |
| 3 | Temperature of flue gas at inlet | 135 | □ |
| 4 | Sulfur dioxide content at inlet | 1600 | mg/Nm³ |
| 5 | Desulfurization rate | 99.9 | wt % |
| 6 | Nitrogen oxides content at inlet | 450 | mg/Nm³ |
| 7 | Denitrification rate | 92 | wt % |

TABLE 2-continued

Parameters of Flue Gas Desulfurization and Denitrification

| No. | Item | Value | Unit |
|---|---|---|---|
| 8 | Dust content at inlet | 111 | mg/Nm$^3$ |
| 9 | Dust removal rate | 99 | wt % |
| 10 | Moisture content of flue gas | 5.3 | wt % |

TABLE 3

Parameters of Discharged Flue Gas after Desulfurization and Denitrification

| No. | Item | Value | Unit |
|---|---|---|---|
| 1 | Flow velocity of flue gas at outlet (in working condition) | 116400 | m$^3$/h |
| 2 | Temperature of discharged flue gas | 65 | □ |
| 3 | Sulfur dioxide content of discharged flue gas | 1.70 | mg/Nm$^3$ |
| 4 | Nitrogen oxides content of discharged flue gas | 38.99 | mg/Nm$^3$ |
| 5 | Dust content at outlet | 1.08 | mg/Nm$^3$ |
| 6 | Output of by-product | 4.32 | t/h |

The formulations and results of the performance tests are listed in Tables 4 and 5.

TABLE 4

Formulation of Cementitious Materials

| No. | By-product | Magnesium oxide | Slag | Fly ash | Additive |
|---|---|---|---|---|---|
| Example 1 | 100 | 170 | 40 | 70 | 5 |
| Example 2 | 100 | 170 | 70 | 40 | 5 |
| Example 3 | 100 | 170 | 40 | 90 | 5 |

TABLE 5

Results of Tests of Cementitious Material Performance

| No. | 3 day-curing (MPa) Bending strength | 3 day-curing (MPa) Compressive strength | 28 day-curing (MPa) Bending strength | 28 day-curing (MPa) Compressive strength | Density (g/cm$^3$) | Water absorption (%) |
|---|---|---|---|---|---|---|
| Example 1 | 12.0 | 51.0 | 17.0 | 76.3 | 1.41 | 5.4 |
| Example 2 | 11.4 | 49.7 | 15.6 | 73.1 | 1.43 | 6.2 |
| Example 3 | 11.9 | 50.3 | 16.7 | 74.4 | 1.47 | 5.8 |

Examples 4-6

(1) Dry desulfurization and denitrification of a flue gas was performed using the flue gas absorbent from Preparatory example 1. The flow velocity was 2.5 m/s, and the oxygen content was 15 vol %. The other parameters of the flue gas at the inlet and the parameters of the flue gas at the outlet are shown in Tables 6 and 7.

(2) The cementitious materials were obtained by uniformly mixing the by-product having a particle size of 200 mesh or more, magnesium oxide, an industrial solid waste (fly ash plus a mine slag powder) having a particle size of 200 mesh or more, and an additive (sodium dihydrogen phosphate).

TABLE 6

Parameters of Flue Gas Desulfurization and Denitrification

| No. | Item | Value | Unit |
|---|---|---|---|
| 1 | Flow velocity of flue gas at inlet (in working condition) | 1076050 | m$^3$/h |
| 2 | Flow velocity of flue gas in standard condition | 711287 | Nm$^3$/h |
| 3 | Temperature of flue gas at inlet | 140 | □ |
| 4 | Sulfur dioxide content at inlet | 1650 | mg/Nm$^3$ |
| 5 | Desulfurization rate | 99.7 | wt % |
| 6 | Nitrogen oxides content at inlet | 500 | mg/Nm$^3$ |
| 7 | Denitrification rate | 90 | wt % |
| 8 | Dust content at inlet | 105 | mg/Nm$^3$ |
| 9 | Dust removal rate | 99.3 | wt % |
| 10 | Moisture content of flue gas | 5.3 | wt % |

TABLE 7

Parameters of Discharged Flue Gas after Desulfurization and Denitrification

| No. | Item | Value | Unit |
|---|---|---|---|
| 1 | Flow velocity of flue gas at outlet (in working condition) | 810089 | m$^3$/h |
| 2 | Temperature of discharged flue gas | 68 | □ |
| 3 | Sulfur dioxide content of discharged flue gas | 6.57 | mg/Nm$^3$ |
| 4 | Nitrogen oxides content of discharged flue gas | 66.41 | mg/Nm$^3$ |
| 5 | Dust content at outlet | 9.76 | mg/Nm$^3$ |
| 6 | Output of by-product | 4.31 | t/h |

The formulations and results of the performance tests are listed in Tables 8 and 9.

TABLE 8

Formulation of Cementitious Materials

| No. | By-product | Magnesium oxide | Slag | Fly ash | Additive |
|---|---|---|---|---|---|
| Example 4 | 100 | 150 | 40 | 70 | 5 |
| Example 5 | 100 | 150 | 70 | 40 | 5 |
| Example 6 | 100 | 150 | 40 | 90 | 5 |

TABLE 9

Results of Tests of Cementitious Material Performance

| No. | 3 day-curing (MPa) | | 28 day-curing (MPa) | | Density (g/cm³) | Water absorption (%) |
| --- | --- | --- | --- | --- | --- | --- |
| | Bending strength | Compressive strength | Bending strength | Compressive strength | | |
| Example 4 | 11.2 | 41.0 | 15.8 | 70.3 | 1.43 | 5.8 |
| Example 5 | 10.4 | 39.0 | 15.2 | 66.3 | 1.49 | 5.9 |
| Example 6 | 11.0 | 40.7 | 15.6 | 69.1 | 1.46 | 6.2 |

Examples 1 to 6 adopted the same flue gas absorbent. In these examples, although the flue gases were in different working conditions, they all achieved a desulfurization rate of 99% or more, a denitrification rate of 90% or more, and a dust removal rate of 99% or more. Also, the by-products were basically the same in composition, and the resultant cementitious materials were stable in quality. A decrease in the amount of magnesium oxide led to a decrease in mechanical properties.

The present disclosure is not limited to the embodiments described above. Any variation, improvement, or substitution which those skilled in the art can think of but which does not depart from the essence of the present disclosure falls into the scope of the present disclosure.

What is claimed is:

1. A method for producing a cementitious material, which comprises steps of:
   (1) dry desulfurization and denitrification of a flue gas with a flue gas absorbent to give a by-product, wherein the flue gas absorbent comprises 12-22 parts by weight of a nano-sized metal oxide, 12-20 parts by weight of a micro-sized metal oxide, and 42-60 parts by weight of magnesium oxide,
   wherein the nano-sized metal oxide comprises $Fe_2O_3$, $V_2O_5$ and $MnO_2$, and the micro-sized metal oxide comprises $Fe_2O_3$, $V_2O_5$ and $MnO_2$;
   wherein $Fe_2O_3$, $V_2O_5$ and $MnO_2$ in the nano-sized metal oxide are at a weight ratio of 3-5:3-8:5-10, and $Fe_2O_3$, $V_2O_5$ and $MnO_2$ in the micro-sized metal oxide are at a weight ratio of 3-5:3-8:5-10; and
   (2) uniformly mixing the by-product with magnesium oxide, an industrial solid waste and an additive to give the cementitious material, wherein the industrial solid waste is selected from one or more of the group consisting of fly ash, a slag powder, and a construction waste powder, and the additive is selected from one or more of the group consisting of dihydrogen phosphate, monohydrogen phosphate, tartaric acid, tartrate and amino trimethylene phosphonic acid, wherein the by-product, magnesium oxide, the industrial solid waste and the additive are at a weight ratio of 100:100-150:100-130:5-8.

2. The method according to claim 1, wherein the flue gas absorbent is in a dry powder form.

3. The method according to claim 1, wherein during the dry desulfurization and denitrification of step (1), the flue gas has a sulfur dioxide content of 300-40,000 mg/Nm³, a nitrogen oxide content of 50-600 mg/Nm³, an oxygen content of 10-18 vol %, a flow velocity of 2-5 m/s, and a temperature of 110-200° C.

4. The method according to claim 1, wherein $Fe_2O_3$, $V_2O_5$ and $MnO_2$ in the nano-sized metal oxide are at a weight ratio of 4-5:5-6:6-7, and $Fe_2O_3$, $V_2O_5$ and $MnO_2$ in the micro-sized metal oxide are at a weight ratio of 4-5:5-6:6-7.

5. The method according to claim 1, wherein the industrial solid waste is selected from a composition consisting of a slag powder and fly ash at a weight ratio of 30-80:30-100.

* * * * *